(12) United States Patent
Lahr et al.

(10) Patent No.: US 10,583,728 B2
(45) Date of Patent: Mar. 10, 2020

(54) POWERTRAIN AND A VEHICLE

(71) Applicant: GM Global Technology Operations LLC, Detroit, MI (US)

(72) Inventors: Derek F. Lahr, Howell, MI (US); Farzad Samie, Franklin, MI (US); Chunhao J. Lee, Troy, MI (US); Dongxu Li, Troy, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/840,411

(22) Filed: Dec. 13, 2017

(65) Prior Publication Data

US 2019/0176607 A1 Jun. 13, 2019

(51) Int. Cl.
*F16H 45/02* (2006.01)
*B60K 6/26* (2007.10)
*F04B 23/04* (2006.01)
*B60K 6/38* (2007.10)
*B60K 6/405* (2007.10)
*B60K 6/485* (2007.10)
*B60K 17/02* (2006.01)
*F04B 17/05* (2006.01)
*B60K 6/48* (2007.10)

(Continued)

(52) U.S. Cl.
CPC ............... *B60K 6/26* (2013.01); *B60K 6/38* (2013.01); *B60K 6/405* (2013.01); *B60K 6/485* (2013.01); *B60K 17/02* (2013.01); *F04B 17/05* (2013.01); *F04B 23/04* (2013.01); *F16H 45/02* (2013.01); *B60K 2006/4825* (2013.01); *B60W 10/023* (2013.01); *F02N 11/04* (2013.01); *F16H 2045/0215* (2013.01)

(58) Field of Classification Search
CPC .......... B60K 6/26; B60K 17/02; B60K 6/405; B60K 6/485; B60K 6/38; B60K 2006/4825; F04B 17/05; F02N 11/04; B60W 10/023; F16H 45/02; F16H 2045/0215
See application file for complete search history.

(56) References Cited

U.S. PATENT DOCUMENTS

2011/0086739 A1* 4/2011 Kajigai ............... B60K 6/26
477/5
2012/0277049 A1* 11/2012 Phillips ............... F16H 47/08
475/31

(Continued)

*Primary Examiner* — Jacob S. Scott
*Assistant Examiner* — Lillian T Nguyen
(74) *Attorney, Agent, or Firm* — Quinn IP Law

(57) ABSTRACT

A powertrain includes an engine and a transmission. A vehicle includes a body structure and the powertrain supported by the body structure. The powertrain is configured to propel the body structure. The engine includes an output shaft, and the transmission includes an input member. The powertrain further includes a torque converter operable between the output shaft and the input member. The torque converter includes a pump and a turbine. The powertrain also includes a motor-generator operable as a motor and a generator. The input member of the transmission is connected to the turbine such that torque from the torque converter is transferrable to the input member. The input member of the transmission is coupled to the motor-generator such that torque is transferred between the input member and the motor-generator.

20 Claims, 4 Drawing Sheets

(51) Int. Cl.
*B60W 10/02* (2006.01)
*F02N 11/04* (2006.01)

(56) References Cited

U.S. PATENT DOCUMENTS

| | | | |
|---|---|---|---|
| 2013/0017915 A1* | 1/2013 | Miyata | B60K 6/365 475/5 |
| 2015/0053522 A1* | 2/2015 | Borntrager | F16H 47/08 192/3.34 |
| 2015/0065294 A1* | 3/2015 | Borntrager | B60K 6/48 477/4 |
| 2016/0084363 A1* | 3/2016 | Steinberger | B60K 6/38 192/3.28 |
| 2016/0290464 A1* | 10/2016 | Kernchen | F16H 41/26 |

* cited by examiner

POWERTRAIN AND A VEHICLE

INTRODUCTION

A vehicle can include an engine coupled to a transmission and a final drive to rotate wheels that move the vehicle. Generally, the transmission is coupled to the engine to receive torque outputted from the engine. The vehicle can include a torque converter connected to an output shaft of the engine and an input member of the transmission. The torque converter can provide the desired multiplication of torque from the engine into the transmission.

Some vehicles can be hybrid vehicles that include a motor-generator unit. The motor-generator unit can start the engine or act as a torque assist which provides torque to a crankshaft of the engine. The motor-generator can act as a generator to generate current, i.e., electricity, or recharge an energy storage apparatus.

SUMMARY

The present disclosure provides a powertrain including an engine and a transmission. The engine includes an output shaft, and the transmission includes an input member. The powertrain further includes a torque converter operable between the output shaft and the input member. The torque converter includes a pump and a turbine. The powertrain also includes a motor-generator operable as a motor and a generator. The input member of the transmission is connected to the turbine such that torque from the torque converter is transferrable to the input member. The input member of the transmission is coupled to the motor-generator such that torque is transferred between the input member and the motor-generator.

The powertrain optionally includes one or more of the following:

A) a first oil pump coupled to the torque converter such that the first oil pump is configured to be operable via the torque transferred through the torque converter;

B) the first oil pump configured to pump oil through the transmission when torque is transferred through the torque converter when the engine is running;

C) a second oil pump configured to be operable independently of torque from the torque converter;

D) the second oil pump configured to be operable to pump oil through the transmission when the engine is off;

E) the transmission includes a clutch assembly having a flange coupled to the motor-generator;

F) the flange and the input member are fixed to each other such that torque is transferred between the input member and the motor-generator through the flange;

G) the clutch assembly includes a clutch body coupled to the flange;

H) a connector coupled to the clutch body and the motor-generator such that torque is transferred between the clutch body and the motor-generator through the connector;

I) the connector is further defined as a gear;

J) an endless rotatable member coupled to the gear and the motor-generator to transfer torque therebetween;

K) the torque converter includes a casing fixed to the output shaft and the pump;

L) the first oil pump coupled to the output shaft of the engine through the casing such that torque transferred from the torque converter mechanically operates the first oil pump;

M) the first oil pump coupled to the connector such that torque transferred from the torque converter mechanically operates the first oil pump;

N) the transmission includes a housing;

O) the torque converter includes a casing fixed to the output shaft;

P) the clutch body and the flange are each contained inside the housing;

Q) the input member of the transmission is partially contained inside the casing and partially contained inside the housing;

R) the torque converter includes a casing fixed to the output shaft and the pump such that operation of the engine causes the output shaft to rotate which transfers rotation to the casing and the pump to operate the pump;

S) the pump includes a hub extending from the casing and terminating at a distal end;

T) the transmission includes a housing having a first portion disposed proximal to the casing of the torque converter;

U) the housing of the transmission includes a stator connection extending outwardly toward the casing;

V) the stator connection is at least partially disposed between the input member of the transmission and the hub of the pump;

W) the first portion of the housing includes a first side facing the torque converter and a second side facing away from the torque converter;

X) the stator connection extends from the first side of the first portion;

Y) the input member includes a connector proximal to the second side;

Z) the motor-generator coupled to the connector such that torque is transferred between the input member and the motor-generator;

AA) the first portion disposed between the casing and the connector;

BB) the first oil pump coupled to the connector such that torque transferred through the input member mechanically operates the first oil pump;

CC) the first oil pump configured to pump oil through the transmission when torque is transferred through the input member when the engine is running;

DD) the transmission includes a housing having a first portion and a second portion spaced from each other;

EE) the pump includes a first connector directly coupled to the distal end of the hub, and the first connector is disposed between the first and second portions of the housing;

FF) the first oil pump coupled to the first connector such that torque transferred from the output shaft of the engine through the casing mechanically operates the first oil pump;

GG) the first oil pump configured to pump oil through the transmission when torque is transferred through the output shaft when the engine is running;

HH) the first portion of the housing includes a stator connection extending outwardly between the input member and the hub;

II) the input member includes a second connector spaced from the first connector;

JJ) the motor-generator coupled to the second connector such that torque is transferred between the input member and the motor-generator;

KK) the second portion of the housing disposed between the first connector and the casing of the torque converter;

LL) the housing of the transmission includes a third portion spaced from the first and second portions;

MM) the first, second and third portions each include a segment generally extending in the same direction;

NN) the second connector disposed between the segments of the first and third portions; and OO) the first oil pump indirectly coupled to the output shaft such that the first oil pump is configured to be operable via the torque transferred through the torque converter.

The present disclosure also provides a vehicle including a body structure and a powertrain supported by the body structure. The powertrain is configured to propel the body structure. The powertrain includes an engine and a transmission. The engine includes an output shaft, and the transmission includes an input member. The powertrain also includes a torque converter operable between the output shaft and the input member. The torque converter includes a pump and a turbine. The powertrain further includes a motor-generator operable as a motor and a generator. The input member of the transmission is connected to the turbine such that torque from the torque converter is transferrable to the input member. The input member of the transmission is coupled to the motor-generator such that torque is transferred between the input member and the motor-generator.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
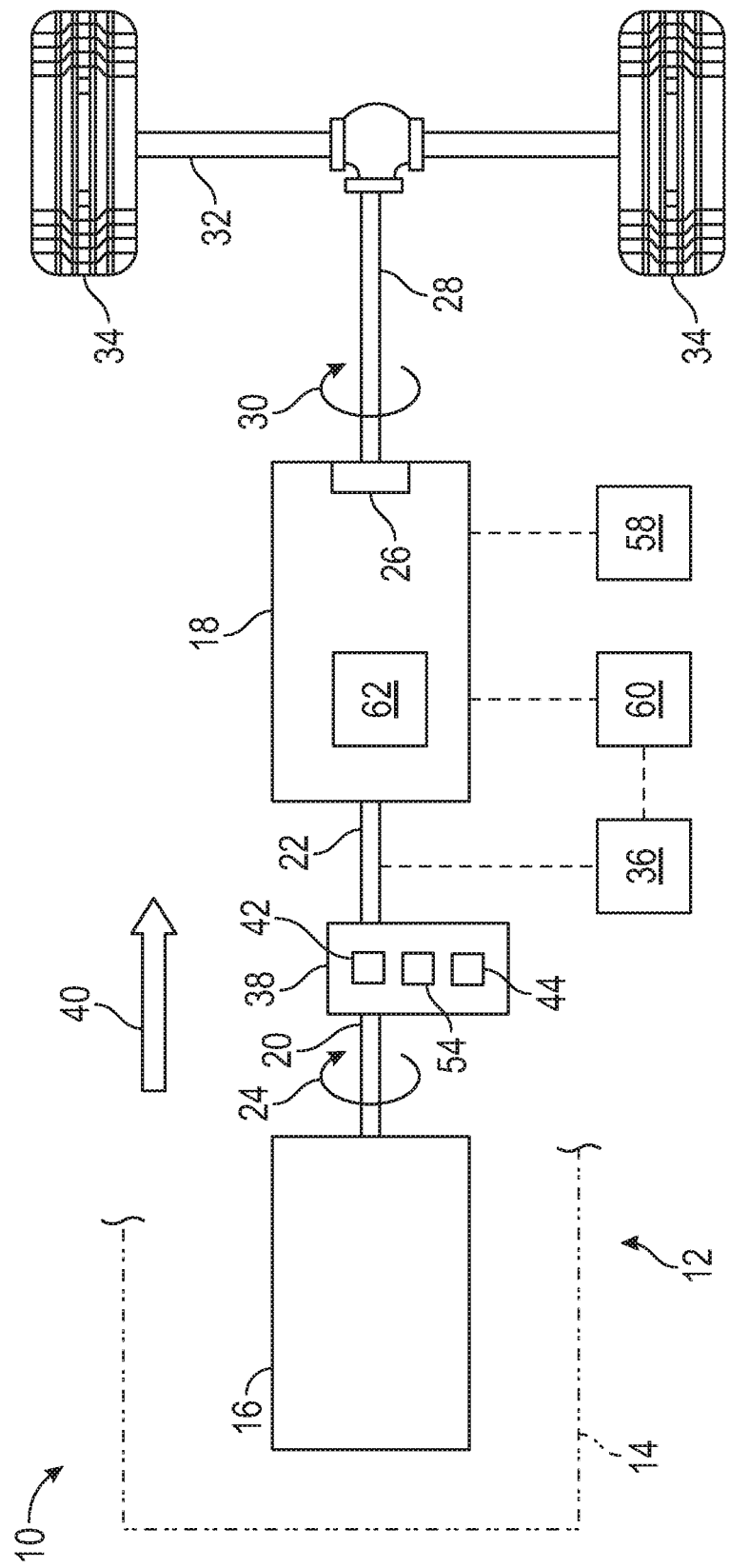
FIG. 1 is a schematic illustration of a vehicle including a powertrain.

Referring to the FIGS., wherein like numerals indicate like or corresponding parts throughout the several views, a vehicle 10 and a powertrain 12 are generally shown in FIG. 1.

The powertrain 12 can be utilized in a vehicle application or a non-vehicle application. Non-limiting examples of the vehicle 10 can include cars, trucks, all-terrain vehicles, off-road vehicles, recreational vehicles, aircrafts, boats, watercrafts, farm equipment or any other suitable movable platform. Additionally, the vehicle 10 can include autonomously driven vehicles or vehicles driven via a human. Furthermore, the vehicle 10 can be an electric vehicle, a hybrid vehicle, etc. Non-limiting examples of the non-vehicles can include machines, farm equipment or any other suitable non-vehicle.

The vehicle 10 can include a body structure 14. The body structure 14 can include one or more of a frame, a body panel, an outer skin, etc. The body structure 14 can include the structure that defines a passenger compartment, an engine 16 compartment, a storage compartment, etc. In the vehicle application, the powertrain 12 can be supported by the body structure 14. Generally, the powertrain 12 is configured to propel the body structure 14. In other words, for the vehicle application, the powertrain 12 can propel the vehicle 10.

Continuing with FIG. 1, the powertrain 12 includes an engine 16 and a transmission 18 coupled to the engine 16. Generally, the transmission 18 is coupled to the engine 16 to receive torque outputted from the engine 16. The engine 16 can be an internal combustion engine or any other suitable type of engine.

Continuing with FIG. 1, the engine 16 includes an output shaft 20, and the transmission 18 includes an input member 22. The output shaft 20 of the engine 16 rotates at an engine speed 24 (see arrow 24 in FIG. 1), and torque from rotation of the output shaft 20 is transferred to the input member 22 of the transmission 18, which causes the input member 22 to rotate. The output shaft 20 can be referred to as a crankshaft.

The powertrain 12 of the vehicle 10 can include one or more electric traction motors in an optional hybrid embodiment to provide additional sources of input torque. Non-limiting examples of the transmission 18 can include automatic transmission, dual-clutch transmission, automated manual transmission, continuously variable transmission (CVT), etc.

Again continuing with FIG. 1, the transmission 18 can include a final drive 26 surrounding the input member 22 and an output member 28 that delivers output torque 30 (see arrow 30 in FIG. 1) to one or more drive axles 32 through the final drive 26, and ultimately to a set of wheels 34. Therefore, torque from the engine 16 is transferred to the transmission 18, and the transmission 18 outputs torque to drive the wheels 34. It is to be appreciated that the final drive 26 can be driven by an endless rotatable member, and non-limiting examples of the endless rotatable member can include a belt or a chain.

Continuing with FIG. 1, the powertrain 12 includes a motor-generator 36 and a torque converter 38. Generally, the motor-generator 36 is coupled to the torque converter 38. Furthermore, the motor-generator 36 can be coupled to the transmission 18. Different arrangements of the way the motor-generator 36 is coupled to the torque converter 38 and the transmission 18 are discussed further below.

The motor-generator 36 can operate as a motor and as a generator in certain situations. The powertrain 12 can be referred to as a hybrid powertrain because the powertrain 12 utilizes the motor-generator 36 which can assist in reducing fuel consumption and emissions of the vehicle 10. For example, in certain embodiments, the motor-generator 36 can be utilized as a motor to start the engine 16, and as a torque assist which provides torque to the crankshaft to assist in propelling the vehicle 10 when the vehicle 10 is moving. Furthermore, the motor-generator 36 can be utilized as a motor to transfer torque to the input member 22 of the transmission 18 and ultimately to the wheels 34 to propel the vehicle 10. As another example, the motor-generator 36 can be utilized as a generator to generate current, i.e., electricity, and can recharge one or more energy storage apparatuses. When the motor-generator 36 is generating current/electricity, the current can drive various auxiliary devices of the vehicle 10, which is discussed further below.

Referring to FIG. 1, in the vehicle application, the torque converter 38 is operable between the output shaft 20 and the input member 22. For example, the torque converter 38 can be connected to the output shaft 20 of the engine 16 and the input member 22 of the transmission 18. As such, the output shaft 20 of the engine 16 is rotatable to transfer torque in a direction to the input member 22 of the transmission 18 through the torque converter 38. The direction that torque is transferred is illustrated by arrow 40 (see FIG. 1). The torque converter 38 can provide the desired multiplication of torque from the engine 16 into the transmission 18 at low speeds.

Continuing with FIG. 1, the torque converter 38 includes a pump 42 and a turbine 44. The turbine 44 can be fluidly connected to the pump 42. Hence, the pump 42 and the turbine 44 can be operable through a fluid coupling, in which fluid that moves through the pump 42, due to rotation of the pump 42, is transferred to the turbine 44 which causes rotation of the turbine 44. Generally, in the vehicle application, the pump 42 is coupled to the output shaft 20 of the engine 16 and the turbine 44 is coupled to the input member 22 of the transmission 18.

Furthermore, the pump 42 and the turbine 44 are each rotatable. The pump 42 and the turbine 44 can be rotatable concurrently or independently of each other. A fluid is transferred from the pump 42 to the turbine 44, and back again, in a loop during rotation of the pump 42 and the turbine 44. The fluid can be a liquid fluid, and non-limiting examples of the liquid fluid can include transmission fluid, oil, synthetic oil, etc.

The engine 16 can optionally include a plate fixed to the output shaft 20 (of the engine 16). The plate can be directly or indirectly fixed to the output shaft 20. Therefore, the plate and the output shaft 20 are rotatable concurrently. As such, the plate rotates at the same speed as that the output shaft 20. The plate can be referred to as a flywheel, a drive plate or a flex plate.

Figure 2:
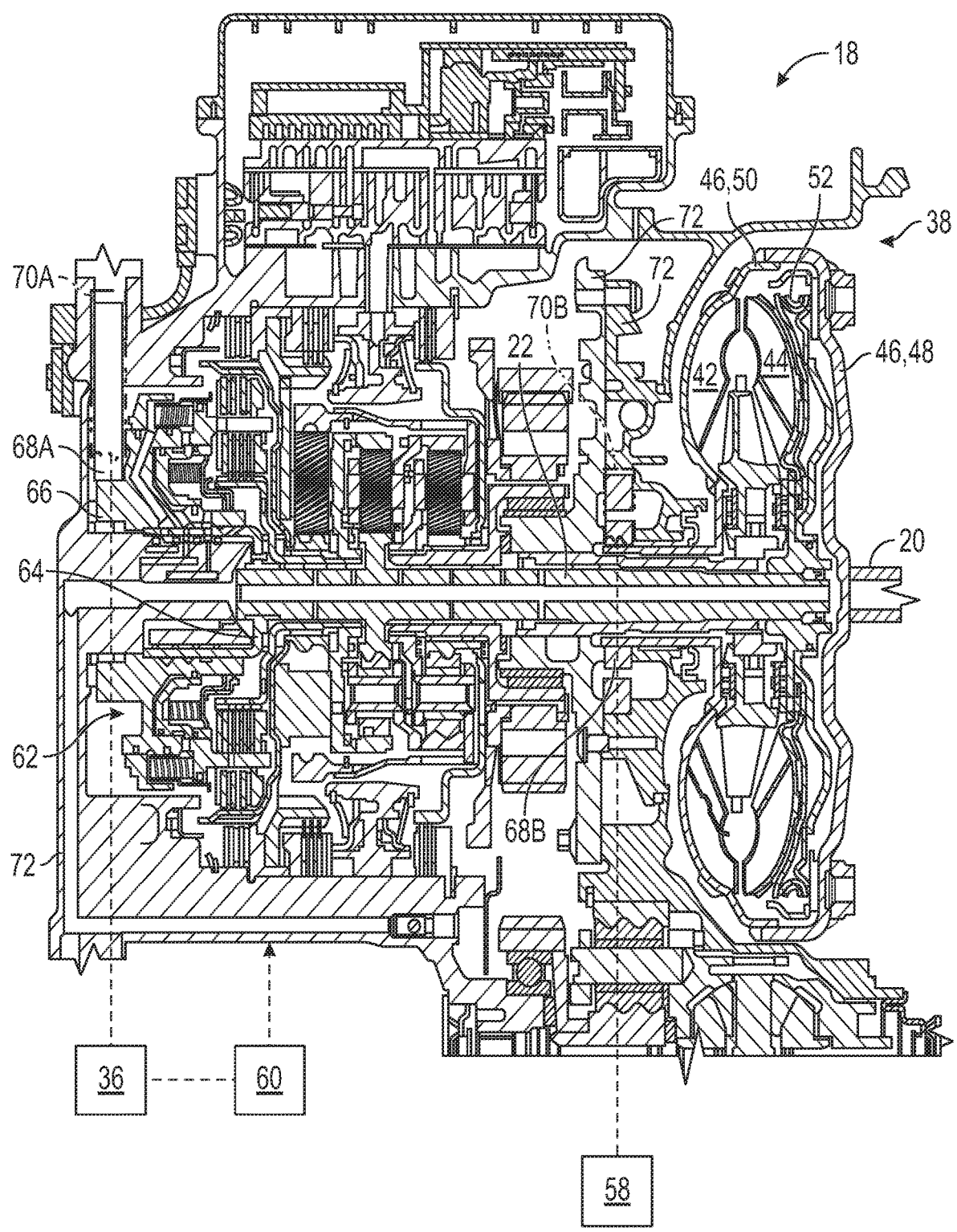
FIG. 2 is a schematic fragmentary cross-sectional view of the powertrain including one arrangement of a motor-generator and a first oil pump.
Figure 3:
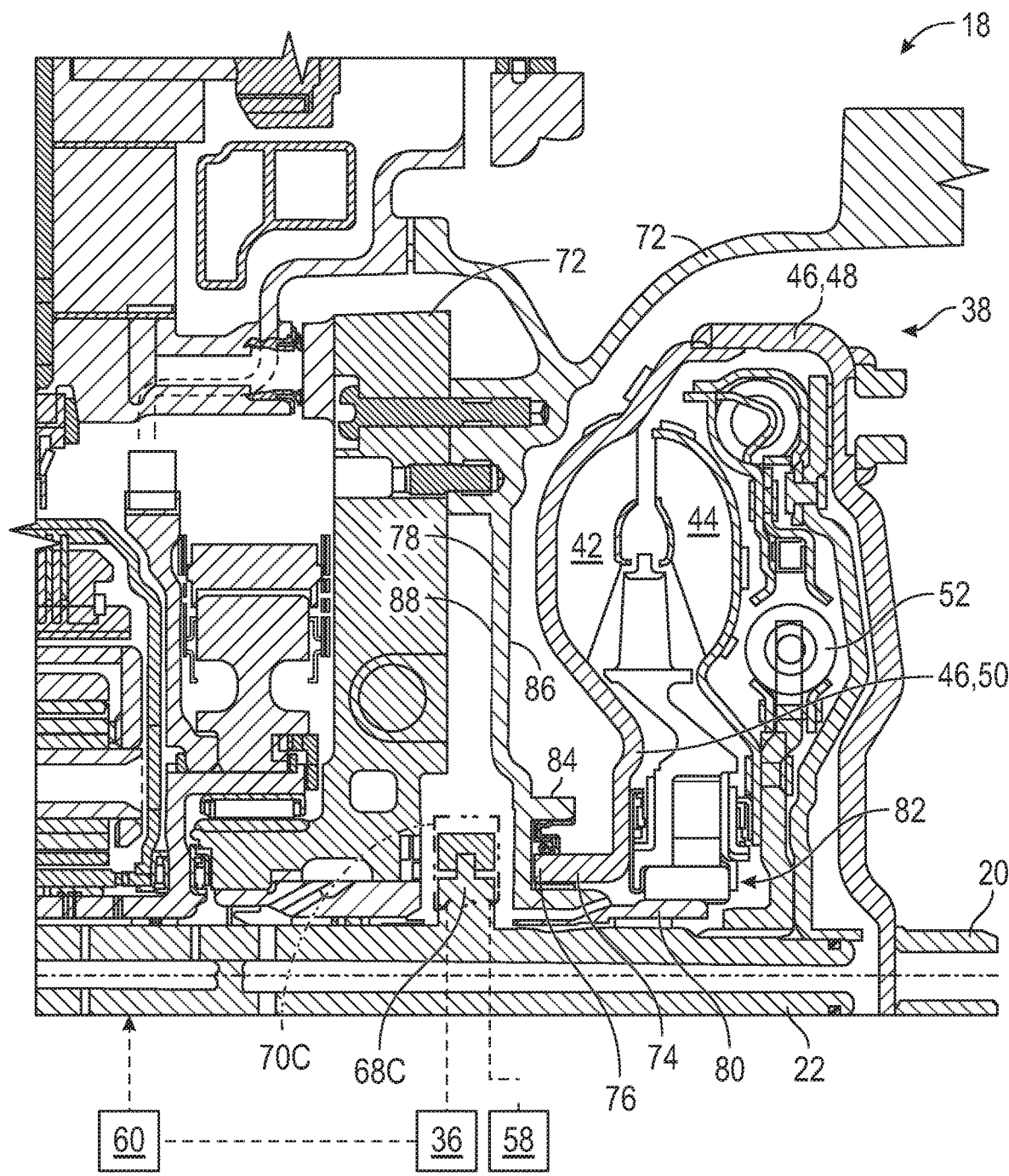
FIG. 3 is a schematic fragmentary cross-sectional view of the powertrain including another arrangement of the motor-generator and the first oil pump.
Figure 4:
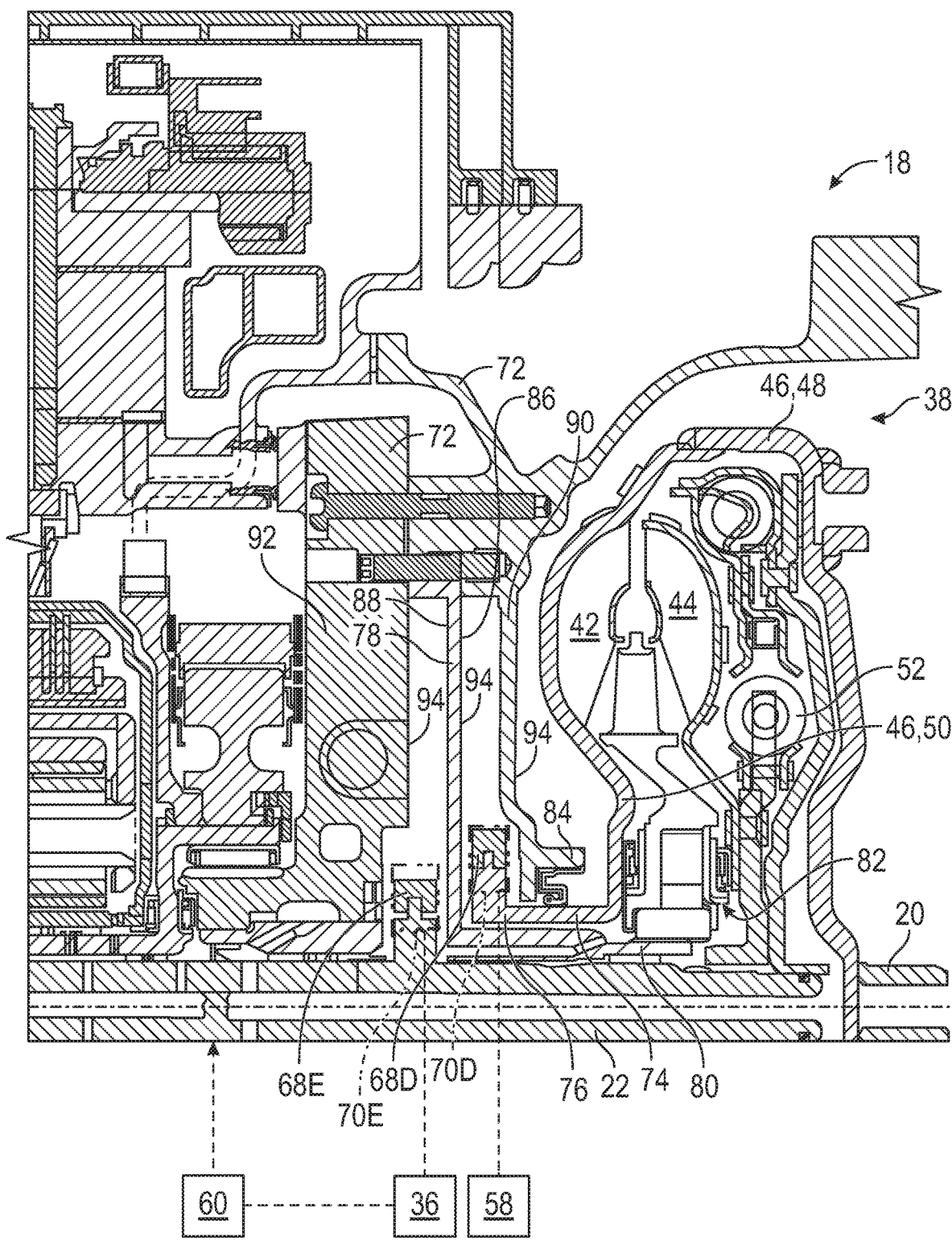
FIG. 4 is a schematic fragmentary cross-sectional view of the powertrain including yet another arrangement of the motor-generator and the first oil pump.

As best shown in FIGS. 2-4, the torque converter 38 can include a casing 46. The casing 46 can be fixed to the output shaft 20 and the pump 42 such that operation of the engine 16 causes the output shaft 20 to rotate which transfers rotation to the casing 46 and the pump 42 to operate the pump 42. The casing 46 can be fixed to the output shaft 20 and/or the plate either directly or indirectly. More specifically, in certain embodiments, the casing 46 can be fixed to the output shaft 20 and the pump 42. Generally, the casing 46 can contain the pump 42 and the turbine 44.

In certain embodiments, the casing 46 can be split into separate pieces, for example, the casing 46 can include a first casing portion 48 and a second casing portion 50 (see FIGS. 2-4). As shown in FIGS. 2-4, the output shaft 20 can be fixed to the casing 46, and more specifically, fixed through the first casing portion 48. Alternatively, the casing 46 can be formed as one-piece.

Continuing with FIGS. 2-4, the second casing portion 50 can house at least part of the pump 42. Movement of the second casing portion 50 causes movement of the pump 42. The second casing portion 50 is fixed (either directly or indirectly) to the first casing portion 48 by one or more fastener, such as a bolt, a pin, etc., or welded thereto. The pump 42 is rotatable with the output shaft 20 through the casing 46. Therefore, the pump 42 rotates at the same speed as the output shaft 20. Rotation of the pump 42 causes the fluid inside the pump 42 to move toward the turbine 44. Movement of the fluid into the turbine 44 from the pump 42 causes the turbine 44 to rotate. As such, the pump 42 and the turbine 44 are fluidly connected. The pump 42 is rotatable to transfer torque through the turbine 44. The turbine 44 can rotate at the same speed or a different speed from the pump 42, which is discussed further below.

Referring to FIGS. 2-4, the torque converter 38 can include a damper 52 operable upstream from the turbine 44. Furthermore, the damper 52 is operable in a parallel relationship relative to the fluid coupling between the pump 42 and the turbine 44. As best shown in FIGS. 2-4, the damper 52 is operable upstream from the turbine 44 relative to the direction that torque is transferred. The damper 52 is configured to reduce oscillation from the pump 42 toward the turbine 44. As such, oscillations from the engine 16 are transferred to the damper 52 through the pump 42, and the damper 52 reduces those oscillations.

Turning to FIG. 1, the torque converter 38 can also include a clutch 54. In certain embodiments, the clutch 54 can be operable between the pump 42 and the turbine 44. The clutch 54 of the torque converter 38 can be operable in a slip condition, a full lock condition and an open condition. Generally, the clutch 54 is in the open condition when the engine 16 is off and running in an electric mode. Furthermore, when the engine 16 is running, the clutch 54 can transition from the open condition to the full lock condition or a slow slip condition. In certain embodiments, the clutch 54 is a one-way clutch 54. The different conditions are further discussed below.

With regard to the slip condition, the clutch 54 can operate to allow slip between the pump 42 and the turbine 44, i.e., allows the turbine 44 to rotate at a different speed from the pump 42. The damper 52 is configured to reduce oscillation from operation of the engine 16 to the input member 22 of the transmission 18 when the clutch 54 is engaged in the slip condition or the full lock condition. In certain embodiments, the clutch 54 and the damper 52 can both damp oscillations from the engine 16, which thus reduces the amount of oscillations being transferred to the input member 22 of the transmission 18. The clutch 54 can be adjustable to change an amount of pressure clamping together friction plates. Therefore, depending on the desired amount of slip between the pump 42 and the turbine 44, the amount of pressure that clamps the friction plates together can be changed by a solenoid of the clutch 54 to allow the pump 42 and the turbine 44 to slip relative to each other.

The clutch 54 can also operate in the full lock condition which is when the pump 42 and turbine 44 are locked together, i.e., allows the pump 42 and the turbine 44 to rotate that the same speed. The clutch 54 is operable in the full lock condition in which the clutch 54 locks the pump 42 and the turbine 44 together through the damper 52 such that the pump 42 and the turbine 44 rotate at the same speed. In other words, the clutch 54 can be operable to prevent slip between the pump 42 and the turbine 44.

When the clutch 54 is in the open condition, the clutch 54 is disengaged, and the pump 42 and the turbine 44 operate through the fluid coupling. Therefore, the pump 42 and the turbine 44 are not locked together by the clutch 54. Simply stated, the clutch 54 is not being operated when in the open condition.

As best shown in FIGS. 2-4, in certain embodiments, the input member 22 of the transmission 18 is connected to the turbine 44 such that torque from the torque converter 38 is transferrable to the input member 22. Furthermore, the input member 22 of the transmission 18 is coupled to the motor-generator 36 such that torque is transferred between the input member 22 and the motor-generator 36. Therefore, for example, when the engine 16 is on and operating to propel the vehicle 10, torque can be transferred from the output shaft 20 of the engine 16 through the torque converter 38 to the input member 22 of the transmission 18 and then to the motor-generator 36. As another example, when the engine 16 is off, torque can be transferred from the motor-generator 36 to the input member 22 of the transmission 18 and then out to the wheels 34. As yet another example, when the vehicle 10 is slowing down, torque from rotation of the wheels 34 can be transferred to the motor-generator 36 through the input member 22 of the transmission 18.

Referring to FIGS. 1-4, the powertrain 12 can include a first oil pump 58. In certain embodiments, the first oil pump 58 is coupled to the torque converter 38 such that the first oil pump 58 is configured to be operable via the torque transferred through the torque converter 38. The first oil pump 58 can be configured to pump oil through the transmission 18 when torque is transferred through the torque converter 38 when the engine 16 is running. More specifically, the first oil pump 58 can be indirectly coupled to the output shaft 20 such that the first oil pump 58 can be configured to be operable via the torque transferred through the torque converter 38. Furthermore, in certain embodiments, the first oil pump 58 can be configured to pump oil through the transmission 18 when torque is transferred through the input member 22. The first oil pump 58 is a mechanically driven pump 42.

With regard to FIGS. 2 and 4, if the engine 16 is off, such as when the vehicle 10 is in the electric mode, the first oil pump 58 is not operable to pump oil through the transmission 18. Therefore, operation of the first oil pump 58 is connected to whether the engine 16 is operating for FIGS. 2 and 4. With regard to FIG. 3, if the engine 16 is off, such as when the vehicle 10 is in the electric mode, the first oil pump 58 can be operable to pump oil through the transmission 18 when the motor-generator 36 transfers torque to the input member 22 of the transmission 18. Therefore, operation of the first oil pump 58 can be when the engine 16 is on or when the engine 16 is off for FIG. 3.

Continuing with FIGS. 1-4, the powertrain 12 can also include a second oil pump 60 configured to be operable independently of torque from the torque converter 38. Generally, the second oil pump 60 is configured to be operable to pump oil through the transmission 18 when the engine 16 is off. Said differently, when the first oil pump 60 is not being operated, but the vehicle 10 is on, the second oil pump 60 can be operable to pump oil through the transmission 18. Therefore, the second oil pump 60 can be an auxiliary electric pump 42. The second oil pump 60 can be in electrical communication with the motor-generator 36. Therefore, when the engine 16 is off, the motor-generator 36 can operate as a generator to deliver current to the second oil pump 60 to operate the second oil pump 60 such that the second oil pump 60 can pump oil through the transmission 18 when the vehicle 10 is operating in the electric mode.

The different arrangements of the motor-generator 36 and the first oil pump 58 are discussed below with regard to FIGS. 2-4. It is to be appreciated for these arrangements, an engine disconnect can be eliminated between the pump 42 of the torque converter 38 and the plate of the engine 16. Therefore, these arrangements can provide a simplified turbine disconnect. Additionally, these arrangements can minimize changes to the transmission envelope, especially near vehicle frame rails. Furthermore, these arrangements allow for a smaller mechanical pump to be utilized, i.e., the first oil pump 58, which can provide fuel savings.

Referring to FIG. 2, the transmission 18 can include a clutch assembly 62 having a flange 64 coupled to the motor-generator 36. The flange 64 and the input member 22 are fixed to each other such that torque is transferred between the input member 22 and the motor-generator 36 through the flange 64. Therefore, rotation can be transferred between the input member 22 and the flange 64. Furthermore, in certain embodiments, the flange 64 and the input member 22 are fixed to each other such that torque is transferred from the input member 22, to the flange 64 and then to the motor-generator 36. In certain embodiments, the clutch assembly 62 can also include a clutch body 66 coupled to the flange 64.

Continuing with FIG. 2, the powertrain 12 can also include a connector 68A coupled to the clutch body 66 and the motor-generator 36 such that torque is transferred between the clutch body 66 and the motor-generator 36 through the connector 68A. Therefore, rotation of the clutch body 66 can cause rotation of the connector 68A. In certain embodiments, torque can be transferred from the clutch body 66 to the motor-generator 36 through the connector 68A. The connector 68A can be any suitable configuration, and non-limiting examples can include the connector 68A being further defined as a gear, a sprocket, etc.

The powertrain 12 can include an endless rotatable member 70A (see FIG. 2) coupled to the gear, i.e., the connector 68A, and the motor-generator 36 to transfer torque therebetween. The endless rotatable member 70A can be any suitable configuration, and non-limiting examples can include a belt, a chain, etc.

Continuing with FIG. 2, the first oil pump 58 can be coupled to the output shaft 20 of the engine 16 through the casing 46 such that torque transferred from the torque converter 38 mechanically operates the first oil pump 58. Another connector 68B can be rotatably coupled or fixed to the casing 46 to transfer torque to the first oil pump 58. Another endless rotatable member 70B can be coupled to the connector 68B and the first oil pump 58 to operate the first oil pump 58. Therefore, for FIG. 2, torque transferred from operation of the engine 16 is transferred to the connector 68B through the casing 46 to operate the first oil pump 58, but when the engine 16 is off, the first oil pump 58 does not operate because the engine 16 is not transferring torque. This connector 68B can be further defined as a gear, a sprocket, etc., and this endless rotatable member 70B can include a belt, a chain, etc.

As such, the connector 68A for the motor-generator 36 and the connector 68B for the first oil pump 58 are spaced from each other. Therefore, the motor-generator 36 and the first oil pump 58 are operable through separate connectors 68A, 68B. For the arrangement of FIG. 2, the motor-generator 36 operates through the input member 22 of the transmission 18 which is downstream of the turbine 44 relative to the direction that torque is transferred (arrow 40), and the first oil pump 58 operates through the casing 46 of the torque converter 38.

Referring to FIGS. 2-4, the transmission 18 can include a housing 72. Generally, the clutch body 66 and the flange 64 are each contained inside the housing 72. The input member 22 of the transmission 18 can be partially contained inside the casing 46 and partially contained inside the housing 72 (see FIGS. 2-4). For FIGS. 2-4, the motor-generator 36 can be disposed inside or outside of the housing 72 of the transmission 18, and additionally, the first and second oil pumps 58, 60 can be disposed inside or outside of the housing 72 of the transmission 18.

Turning to FIGS. 3 and 4, generally, the pump 42 can include a hub 74 extending from the casing 46 and terminating at a distal end 76. Depending on the arrangement of the motor-generator 36 and the first oil pump 58, the hub 74 of the pump 42 can be different lengths (compare FIGS. 3 and 4).

Continuing with FIGS. 3 and 4, the housing 72 of the transmission 18 can include a first portion 78 disposed proximal to the casing 46 of the torque converter 38. The first portion 78 can be different configurations depending on the arrangement of the motor-generator 36 and the first oil pump 58.

Furthermore, as shown in FIGS. 3 and 4, the housing 72 of the transmission 18 can also include a stator connection 80 and the torque converter 38 can include a stator assembly 82 coupled to the stator connection 80. The stator assembly 82 can be contained inside the casing 46 of the torque converter 38. The stator assembly 82 is grounded to the housing 72 of the transmission 18 through the stator connection 80. Additionally, the housing 72 of the transmission 18 can include a protrusion 84 spaced from the stator connection 80.

Referring to FIG. 3, the stator connection 80 can extend outwardly toward the casing 46. The stator connection 80 is at least partially disposed between the input member 22 of the transmission 18 and the hub 74 of the pump 42. The stator connection 80 of this configuration can be fixed to the first portion 78 of the housing 72, and the protrusion 84 can be fixed to the first portion 78 of the housing 72. Therefore, the stator assembly 82 can be grounded to the housing 72 through the first portion 78. The protrusion 84 and the stator connection 80 can generally extend in the same direction, and thus, in certain embodiments, the distal end 76 of the hub 74 can be disposed between the protrusion 84 and the stator connection 80.

Continuing with FIG. 3, the first portion 78 of the housing 72 can include a first side 86 facing the torque converter 38 and a second side 88 facing away from the torque converter 38. The stator connection 80 can extend from the first side 86 of the first portion 78. Furthermore, the protrusion 84 can extend from the first side 86 of the first portion 78.

The input member 22 can include a connector 68C proximal to the second side 88. Therefore, the connector 68C is spaced from the first portion 78 of the housing 72 and the casing 46. Furthermore, the first portion 78 can be disposed between the casing 46 and the connector 68C. The motor-generator 36 is coupled to the connector 68C such that torque is transferred between the input member 22 and the motor-generator 36. In certain embodiments, torque can be transferred from the input member 22 to the motor-generator 36 through the connector 68C. The connector 68C can be any suitable configuration, and non-limiting examples can include the connector 68C being further defined as a gear, a sprocket, etc.

The powertrain 12 can include an endless rotatable member 70C (see FIG. 3) coupled to the connector 68C. The endless rotatable member 70C can be any suitable configuration, and non-limiting examples can include a belt, a chain, etc.

Continuing with FIG. 3, the first oil pump 58 is also coupled to the connector 68C such that torque transferred through the input member 22 mechanically operates the first oil pump 58. In certain embodiments, torque can be transferred from the torque converter 38 to the input member 22 to mechanically operate the first oil pump 58. In certain embodiments, the first oil pump 58 is configured to pump oil through the transmission 18 when torque is transferred through the input member 22 when the engine 16 is running. Additionally, for this embodiment, the first oil pump 58 can pump oil through the transmission 18 when torque is transferred via the motor-generator 36 through the input member 22 when the engine 16 is off. Therefore, the first oil pump 58 can be operable by the engine 16 or the motor-generator 36 for the configuration of FIG. 3. Both the motor-generator 36 and the first oil pump 58 are operable through a single connector 68C and a single endless rotatable member 70C via the input member 22.

Turning to FIG. 4, the housing 72 of the transmission 18 can include the first portion 78 and a second portion 90 spaced from each other. The pump 42 can include a first connector 68D directly coupled to the distal end 76 of the hub 74, and the first connector 68D is disposed between the first and second portions 78, 90 of the housing 72. In various embodiments, the first connector 68D can be fixed to the distal end 76 of the hub 74. In certain embodiments, the first oil pump 58 can be coupled to the first connector 68D such that torque transferred from the output shaft 20 of the engine 16 through the casing 46 mechanically operates the first oil pump 58. The first oil pump 58 is configured to pump oil through the transmission 18 when torque is transferred through the output shaft 20 when the engine 16 is running. Therefore, for FIG. 4, torque transferred from operation of the engine 16 is transferred to the first connector 68D through the casing 46 to operate the first oil pump 58, but when the engine 16 is off, the first oil pump 58 does not operate because the engine 16 is not transferring torque.

Additionally, continuing with FIG. 4, the input member 22 can include a second connector 68E spaced from the first connector 68D. The motor-generator 36 can be coupled to the second connector 68E such that torque is transferred between the input member 22 and the motor-generator 36. In certain embodiments, torque can be transferred from the input member 22 to the motor-generator 36 through the second connector 68E. The second portion 90 of the housing 72 can be disposed between the first connector 68D and the casing 46 of the torque converter 38. In this configuration, the protrusion 84 extends from the second portion 90 and the stator connection 80 extends from the first portion 78.

In the arrangement of FIG. 4, the motor-generator 36 and the first oil pump 58 are operable through separate connectors 68D, 68E. For the arrangement of FIG. 4, the motor-generator 36 operates through the input member 22 of the transmission 18 which is downstream of the turbine 44 relative to the direction that torque is transferred (arrow 40), and the first oil pump 58 operates through the casing 46 of the torque converter 38.

The first and second connectors 68D, 68E can be any suitable configuration, and non-limiting examples can include the first and second connectors 68D, 68E being further defined as a gear, a sprocket, etc.

The powertrain 12 can include an endless rotatable member 70D (see FIG. 4) coupled to the first connector 68D. Furthermore, another endless rotatable member 70E is coupled to the second connector 68E. The endless rotatable members 70D, 70E can be any suitable configuration, and non-limiting examples can include a belt, a chain, etc.

Continuing with FIG. 4, the first portion 78 of the housing 72 can include the stator connection 80 extending outwardly between the input member 22 and the hub 74. The stator connection 80 can extend outwardly toward the casing 46. The stator connection 80 is at least partially disposed between the input member 22 of the transmission 18 and the hub 74 of the pump 42. The stator connection 80 of this configuration can be fixed to the first portion 78 of the housing 72, and the protrusion 84 can be fixed to the second portion 90 of the housing 72. Therefore, the stator assembly 82 can be grounded to the housing 72 through the second portion 90. The protrusion 84 and the stator connection 80 can generally extend in the same direction, and thus, in certain embodiments, the distal end 76 of the hub 74 can be disposed between the protrusion 84 and the stator connection 80.

Continuing with FIG. 4, the housing 72 of the transmission 18 can include a third portion 92 spaced from the first and second portions 78, 90. The first, second and third portions 78, 90, 92 each include a segment 94 generally extending in the same direction. The second connector 68E can be disposed between the segments 94 of the first and third portions 78, 92.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A powertrain comprising:
   an engine including an output shaft;
   a transmission including an input member;
   a torque converter operable between the output shaft and the input member, and wherein the torque converter includes a pump and a turbine;
   wherein the torque converter includes a casing fixed to the output shaft and the pump such that operation of the engine causes the output shaft to rotate which transfers rotation to the casing and the pump to operate the pump;
   a motor-generator operable as a motor and a generator;
   wherein the input member of the transmission is connected to the turbine such that torque from the torque converter is transferrable to the input member;
   wherein the input member of the transmission is coupled to the motor-generator such that torque is transferred between the input member and the motor-generator; and
   a connector coupled to the motor-generator such that torque is transferrable between the input member and the motor-generator through the connector, and the connector is configured as a gear.

2. The powertrain as set forth in claim 1 further including a first oil pump coupled to the torque converter such that the first oil pump is configured to be operable via the torque transferred through the torque converter, and wherein the first oil pump is configured to pump oil through the transmission when torque is transferred through the torque converter when the engine is running.

3. The powertrain as set forth in claim 2 further including a second oil pump configured to be operable independently of torque from the torque converter, and wherein the second oil pump is configured to be operable to pump oil through the transmission when the engine is off.

4. The powertrain as set forth in claim 1 wherein the transmission includes a clutch assembly having a flange coupled to the motor-generator, and wherein the flange and the input member are fixed to each other such that torque is transferred between the input member and the motor-generator through the flange.

5. The powertrain as set forth in claim 4 wherein the clutch assembly includes a clutch body coupled to the flange, and the connector is coupled to the clutch body and the motor-generator such that torque is transferred between the clutch body and the motor-generator through the connector.

6. The powertrain as set forth in claim 5 further including a first oil pump coupled to the output shaft of the engine through the casing such that torque transferred from the torque converter mechanically operates the first oil pump.

7. The powertrain as set forth in claim 5 wherein the transmission includes a housing, and wherein the clutch body and the flange are each contained inside the housing, and wherein the input member of the transmission is partially contained inside the casing and partially contained inside the housing.

8. The powertrain as set forth in claim 1 further including an endless rotatable member coupled to the gear and the motor-generator to transfer torque therebetween.

9. The powertrain as set forth in claim 1 wherein the pump includes a hub extending from the casing and terminating at a distal end, and wherein the transmission includes a housing having a first portion disposed proximal to the casing of the torque converter, and wherein the housing of the transmission includes a stator connection extending outwardly toward the casing, and wherein the stator connection is at least partially disposed between the input member of the transmission and the hub of the pump.

10. The powertrain as set forth in claim 9 wherein the first portion of the housing includes a first side facing the torque converter and a second side facing away from the torque converter, and wherein the stator connection extends from the first side of the first portion, and wherein the input member includes the connector proximal to the second side, and wherein the first portion is disposed between the casing and the connector.

11. The powertrain as set forth in claim 10 further including a first oil pump coupled to the connector such that torque transferred through the input member mechanically operates the first oil pump, and wherein the first oil pump is configured to pump oil through the transmission when torque is transferred through the input member when the engine is running.

12. The powertrain as set forth in claim 1 wherein the pump includes a hub extending from the casing and terminating at a distal end, and wherein the transmission includes a housing having a first portion and a second portion spaced from each other, and the pump includes a first connector directly coupled to the distal end of the hub, and the first connector is disposed between the first and second portions of the housing.

13. The powertrain as set forth in claim 12 further including a first oil pump coupled to the first connector such that torque transferred from the output shaft of the engine through the casing mechanically operates the first oil pump, and wherein the first oil pump is configured to pump oil through the transmission when torque is transferred through the output shaft when the engine is running.

14. The powertrain as set forth in claim 12 wherein the first portion of the housing includes a stator connection extending outwardly between the input member and the hub.

15. The powertrain as set forth in claim 14 wherein the connector is further defined as a second connector spaced from the first connector, and the input member includes the second connector, and wherein the second portion of the housing is disposed between the first connector and the casing of the torque converter.

16. The powertrain as set forth in claim 15 wherein the housing of the transmission includes a third portion spaced from the first and second portions, and wherein the first, second and third portions each include a segment generally extending in the same direction, and wherein the second connector is disposed between the segments of the first and third portions.

17. The powertrain as set forth in claim 1:
wherein the transmission includes a housing;
wherein the input member of the transmission is partially contained inside the casing and partially contained inside the housing;
further including a first oil pump indirectly coupled to the output shaft such that the first oil pump is configured to be operable via the torque transferred through the torque converter, and wherein the first oil pump is configured to pump oil through the transmission when torque is transferred through the torque converter when the engine is running; and
further including a second oil pump configured to be operable independently of torque from the torque converter, and wherein the second oil pump is configured to be operable to pump oil through the transmission when the engine is off.

18. A vehicle comprising:
a body structure;
a powertrain supported by the body structure and configured to propel the body structure, and wherein the powertrain includes:
an engine including an output shaft;
a transmission including an input member;
a torque converter operable between the output shaft and the input member, and wherein the torque converter includes a pump and a turbine;
a motor-generator operable as a motor and a generator;
wherein the input member of the transmission is connected to the turbine such that torque from the torque converter is transferrable to the input member;
wherein the input member of the transmission is coupled to the motor-generator such that torque is transferred between the input member and the motor-generator;
a gear coupled to the motor-generator such that torque is transferrable between the input member and the motor-generator through the gear;
an endless rotatable member coupled to the gear and the motor-generator to transfer torque therebetween; and
an oil pump in electrical communication with the motor-generator such that the oil pump is operable independently of torque from the torque converter via the motor-generator when the engine is off.

19. The vehicle as set forth in claim 18 wherein the torque converter includes a casing fixed to the output shaft and the pump such that operation of the engine causes the output shaft to rotate which transfers rotation to the casing and the pump to operate the pump.

20. A powertrain comprising:
an engine including an output shaft;
a transmission including an input member;
a torque converter operable between the output shaft and the input member, and wherein the torque converter includes a pump and a turbine;
a motor-generator operable as a motor and a generator;
wherein the input member of the transmission is connected to the turbine such that torque from the torque converter is transferrable to the input member;
wherein the input member of the transmission is coupled to the motor-generator such that torque is transferred between the input member and the motor-generator;
wherein the transmission includes a clutch assembly having a flange coupled to the motor-generator, and wherein the flange and the input member are fixed to each other such that torque is transferred between the input member and the motor-generator through the flange;
wherein the clutch assembly includes a clutch body coupled to the flange, and further including a connector coupled to the clutch body and the motor-generator such that torque is transferred between the clutch body and the motor-generator through the connector; and
wherein the connector is further defined as a gear, and further including an endless rotatable member coupled to the gear and the motor-generator to transfer torque therebetween.

* * * * *